United States Patent [19]

Yoon

[11] Patent Number: 4,670,238

[45] Date of Patent: Jun. 2, 1987

[54] RECYCLED SORBENT FLUE GAS DESULFURIZATION

[75] Inventor: Heeyoung Yoon, McMurray, Pa.

[73] Assignee: Conoco Inc., Wilmington, Del.

[21] Appl. No.: 818,941

[22] Filed: Jan. 15, 1986

[51] Int. Cl.$^4$ .......................... B01J 8/00; C01B 17/00
[52] U.S. Cl. .................................... 423/244; 423/242; 423/243
[58] Field of Search .......... 423/242 A, 242 R, 244 A, 423/244 R, 243

[56] References Cited

U.S. PATENT DOCUMENTS 3,708,266 1/1973 Gustavsson ..................... 423/242
4,533,532 8/1985 Gebhard et al. .................. 423/244
4,571,330 2/1986 Krigmont et al. ................ 423/242

Primary Examiner—Gregory A. Heller
Attorney, Agent, or Firm—Cortlan R. Schupbach

[57] ABSTRACT

An improved process for reducing the sulfur content of a flue gas derived from combination of a sulfur-containing fuel by inserting a dry sulfur sorbent material into the flue gas, then humidifying the sorbent-containing flue gas to enhance sulfur removal. The humidified flue gas is then subjected to electrostatic precipitation separation of solids, the first separated portion containing the highest unreacted sorbent values, which values are reinjected into the flue gas.

2 Claims, 1 Drawing Figure

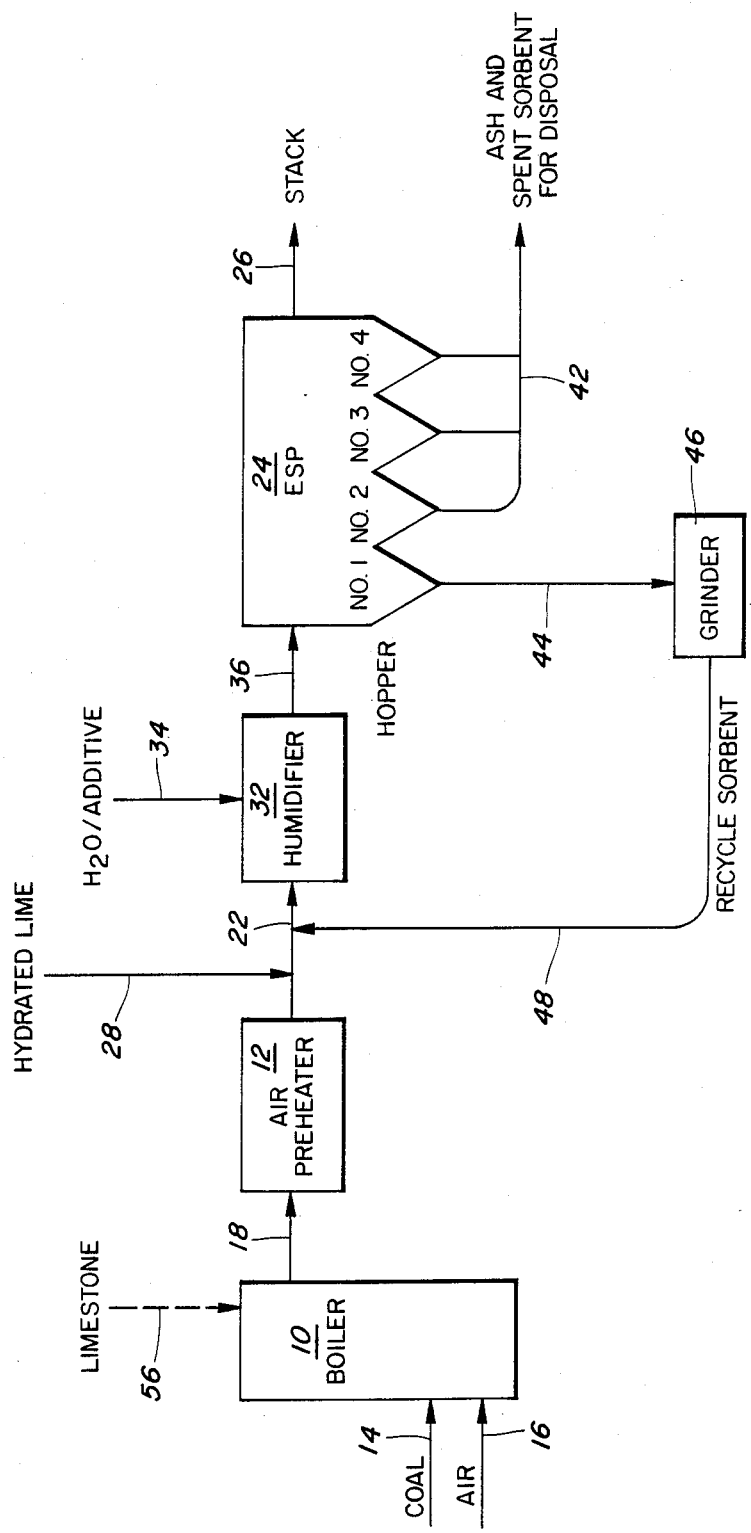

RECYCLED SORBENT FLUE GAS DESULFURIZATION

FIELD OF THE INVENTION

The present invention is directed to an improved process for reducing the sulfur content of flue gas derived from combustion of a sulfur containing fuel in which process first, a dry sorbent and subsequently an aqueous solution containing a solubilizing agent are sprayed into the flue gas. Ash and sorbent are subsequently separated from the flue gas in an electrostatic precipitator classifying apparatus. In the preferred embodiment, a portion of the separated ESP solids is recycled and returned as sorbent.

BACKGROUND OF THE INVENTION

Efforts to reduce sulfur emissions in the gaseous products from combustion of sulfur containing fuels have been made for some time in an effort to comply with evermore stringent governmental regulations. Various processes have attempted to reduce or eliminate the sulfur in fuel prior to combustion, yet other processes propose the addition of compounds to the combustion zone which will in some manner change the nature of the sulfur compounds emitted such that such sulfur compounds may be more readily removed from the combustion process. Still other processes remove sulfur compounds from the gaseous combustion products by chemical reaction.

The approach of chemical treatment to effect flue gas desulfurization can be further subdivided into wet scrubbing wherein a wet solution or suspension of reagent enters and leaves the flue gas contacting zone in a liquid state or spray drying wherein a solution or suspension of reagent enters the flue gas contacting zone in liquid state but is subsequently dried to produce a powdered solid leaving the contacting zone.

Finally, dry treatments are utilized wherein the treating reagent is a solid state powder both entering and leaving the contact zone.

Representative but nonexhaustive examples of art in this area include U.S. Pat. No. 4,185,080 which discloses a combustion gas desulfurization process using a powdered sorbent such as limestone or dolomite added to a combustion zone wherein a portion of the solids collected from the flue gas is reactivated and then returned for injection into or downstream of the combustion zone.

Wet scrubber approaches can be illustrated by U.S. Pat. No. 3,928,537 which discloses contacting the exhaust gas with an aqueous solution of an organic acid to form a soluble sulfite or sulfate. The sulfite or sulfate is removed and the organic acid regenerated in a step comprising reaction with a calcium compound such as an inorganic or an organic acid salt as illustrated by calcium hydroxide or calcium formate.

Spray dryer methods are illustrated by U.S. Pat. No. 4,279,873 which discloses spraying a suspension of fresh, slaked lime and recycled flyash plus spent calcium compound into the hot flue gas in such a manner as to evaporate the slurry droplets to dryness. The resulting powdered solids are removed from flue gas by a downstream electrostatic precipitator or bag filter.

Dry treatment is illustrated by U.S. Pat. No. 4,178,349 which discloses mixing a dry powdered lime bearing material in a reactor and subsequently separating the solids from the treated flue gas. Further, U.S. Pat. No. 4,442,079 describes a flue gas desulfurization process which is primarily adapted to a spray dryer procedure. It is also taught to be applicable to injection of dry sorbent at a point of relatively low flue gas temperature with water sprayed into the gas either upstream or downstream of the sorbent injection point.

However, practical experience has taught that no single strategy as discussed above is the unique answer to sulfur emission problems, whether for new installations or for retrofit on existing facilities. In order to meet sulfur emission standards, numerous site specific factors such as proximity to reagent source, space availability and extent of sulfur removal required must enter into the selection at each combustion site.

SUMMARY OF THE INVENTION

It is an object of the present invention to provide a novel and advantageous method of removing sulfur compounds, especially sulfur dioxide, from combustion exhaust gases. More specifically, in the present invention, flue gas is desulfurized by first contacting the flue gas with a finely-divided dry sorbent including recycle sorbent, and then humidifying the resulting gaseous suspension of solids by spraying therein a solubilizing solution. The resulting flue gas is subject to electrostatic precipitation in a classifying mode such that the first materials obtained from the electrostatic precipitator form the recycle sorbent. In a preferred embodiment, the makeup sorbent is finely ground for injection into the flue gas stream. Most preferably the sorbent is ground to a size such that at least 90 percent by weight will be 25 microns or less (−25 microns) in size.

Additional art relevant to the present invention includes German Offenlegungsschrift No. 3146465 which teaches desulfurizing fossil fuel combustion fumes utilizing a multi-stage electrostatic precipitator where chemisorbtive material is recycled back to the reaction section. ESP use is taught to be divided into several stages wherein the first stage separates dust from the gas stream. Chemisorbtive material is returned to the reactor also optional in combination with fresh lime. However, the reference clearly does not teach the use of humidification which humidification separates the material into a most reactive section in the electrostatic precipitator.

U.S. Pat. No. 4,006,066 utilizes electrostatic precipitators for grading aluminum particles in aluminum production wherein the recovered graded particles are recycled by different routes. U.S. Pat. No. 4,185,080 utilizes a fluidized bed process together with an electrostatic precipitator wherein the most reactive materials are removed from the last stage of the electrostatic precipitator. In this reference, sorbitive material is not injected downstream of the fluidized bed and does not contribute to the active material in the first stage of the electrostatic precipitator.

BRIEF DESCRIPTION OF THE DRAWING

The drawing, the sole FIGURE provided, represents a flow diagram of a flue gas desulfurization process according to the present invention.

DETAILED DESCRIPTION OF THE INVENTION

Flue gases containing sulfur dioxide resulting from combustion of a sulfur containing fuel are typically passed from the combustion chamber through heat recovery exchangers by way of ductwork to a stack for disposal. Whether the fuel is a solid such as coal, or a heavy liquid such as petroleum oils, the combustion product gases will also contain ash solid such as fly ash in which instances the flue gas will first be treated for solids removal prior disposal through a stack such as in a bag filter or an electrostatic precipitator (ESP).

The present invention is described with reference to the drawing. A combustor such as a boiler (10) is adapted to introduce a pulverized solid fuel such as coal from conduit (14) and a combustion supporting gas such as air from conduit (16). Hot combustion products leave boiler (10) travelling past and through various heating exchange services which typically extract heat by radiant and convective transfer until they are discharged from the boiler assembly utilizing duct (18). The final stage of heat recovery from flue gases is often an air preheater (12) which serves to preheat combustion air to conduit (16). It is known that flue gases leaving air preheater (12) by way of duct (22) usually pass directly to solids removal to separate fly ash utilizing means such as a bag filter or electrostatic precipitator (24) and are then discharged to a stack through line (26).

According to the present invention, the hot flue gas in duct (22) is treated for capture of sulfur dioxide and sulfur trioxide content as calcium sulfite or magnesium sulfite by injection of a finely-divided dry sorbent powder such as calcium hydroxide, magnesium hydroxide, hydrated lime or mixture of these by means of a conduit (28) which can optionally use a transport gas such as air or superheated steam. A short distance downstream from conduit (28), duct (22) enters humidifier (32) wherein solubilizing solution from conduit (34) is sprayed into the flue gas. Humidified flue gas passes by way of duct (36) to solids collector (24) and thereon to stack through line (26).

Solids removed in collector (24) normally comprises a mixture of fly ash, spent sorbent, and a proportion of unreacted sorbent. In the present invention, the ESP (24) is utilized as a grading separator wherein hopper number 1 collects the bulk of the unreacted sorbent which is suitable for reuse. The sorbent is passed through line (44) to a grinder such as mill (46) although grinding is not always required and is then passed by way of conduit (48) to enter line (22) immediately prior to humidification in (32).

The unreacted sorbent portion of the solids in conduit (48) is usually in the form of calcium hydroxide and/or magnesium hydroxide.

In one embodiment of the present invention, recycle line (48) can contain the oxide and can be reacted in a hydration apparatus (not shown). Sufficient excess over the stoichiometic amount of water is added to produce a dry hydrated product. This portion of solids containing hydrated sorbent can become the material injected by way of conduit (48) into duct (22).

Sorbent values, both spent and unspent, are continuously discarded from the system by means of conduit (42). Conduit (42) containing the material from the downstream end of the ESP classifying separator. Makeup sorbent can be added to the system as hydrated lime through line (28). If desired, additional sorbent can be added to the boiler downstream of the combustion zone through line (56) as a less expensive limestone or dolomite. Normally this material is added through separate injection ports into an upper region of the combustion zone depending upon the prevailing temperature profile and residence time. The limestone or dolomite will be calcined by the elevated temperature providing a resulting suspension of calcium oxide and/or magnesium oxide to provide additional reaction time for flue gas desulfurization in duct (18) and air preheater (12).

The present invention is especially adapted to remove sulfur dioxide from flue gases wherein the availability of relatively short residence time in the ductwork upstream of the ESP and/or a relatively high concentration of sulfur dioxide combine to present a difficult removal problem. This is especially true in exisiting retrofit installations. The present invention provides humidification of the flue gas and its entrained sorbent powder by spraying water containing a solubilizing agent and such is an essential aspect of the present invention, as this allows the selective separation of unreacted sorbent in the ESP. As a solubilizing agent, it is presently preferred that sodium hydroxide be used although other useful materials include calcium chloride, adipic acid, glycerol, sodium carbonate, $FeCl_3$ and organic dibasic acids. These materials are present at levels of up to about 20 percent by weight based on hydrated lime weight although they will normally be present at levels of about 10 percent or less by weight based on hydrated lime weight. A preferred concentration range is from 2 to 10 percent by weight based on the hydrated lime weight. Although theoretical in nature and I do not wish to be bound thereby, I believe that the compounds which form highly ionized solution or which are deliquiscent form a thin liquid film of greatly increased reactivity with regard to sulfur dioxide on the surface of each of the particles of gas suspended solids sorbent increasing the reaction.

Thus it is necessary to control the humidity or approach to the dew point of the flue gas containing the sorbent and sprayed solution. It is preferable to approach the dew point at the inlet to the solids collector as close as possible without causing operating problems. It is believed that a more humid flue gas permits exisitence of a liquid film on the sorbent and the reaction of gaseous sulfur dioxide with liquid solution is much more rapid than with a solid particle alone. However, it is known that if the dew point is approached too closely, the spray droplets tend to foul and plug the surfaces of ESP collector plates and to cause excessive corrosion of ductwork. Therefore, in the process of the present invention, it is preferred that humidification occur to within 10° C. or to 35° C. of the saturation temperature. The degree of approach to saturation can be controlled by proportioning the amount of flue gas admitted to the humidifier or conversely by the amount of water and additive added.

The degree of desulfurization can also be controlled by the calcium:sulfur ratio in the sorbent as compared to the amount of sulfur dioxide in the flue gas being treated. This ratio is normally expressed in moles and it is preferred that the ratio of calcium hydroxide:sulfur dioxide range from about 0.5:1 to about 3:1 respectively. This ratio is controlled by the flow rates of hydrated lime and recycle sorbent through conduits (28) and (48), respectively. Solubility of the solubilizing salts such as calcium chloride, sodium hydroxide and the like in water, determines the maximum concentration of spray solution. Residence time of the reactive sorbent and flue gas in the ductwork should range up to at least about one second and preferably more.

In normal operation sulfur containing fuels being burned will also contain a significant proportion of ash conforming materials and thus the flue gas will also contain fly ash. Addition of the solubilizing or humidifying solution and dry sorbent according to the present invention causes an increase in the solids loading of the flue gas and thus on the duty to be served by the downstream ESP. The solids retained on the surfaces of the ESP remain active for $SO_2$ absorbtion for a longer period when humidified with a solubilizing agent, particularly when desired close dew point approach is maintained. In addition, this humidification permits selective removal of unreacted sorbent from the front end of the ESP, with less reactive values being collected further downsteam in consecutive hoppers which can be routed to disposal.

Temperature of the flue gas at the injection of the dry sorbent via line (28) should be between about 120° C. and about 230° C. More preferably the temperature should range between about 140° C. and about 175° C.

The present invention is more concretely described with reference to the examples below wherein all parts and percentages are by weight unless otherwise specified. The examples are provided to illustrate the present invention and not to limit it.

EXAMPLE 1

A flue gas from an electrical utility station burning 2.4 weight percent sulfur coal is analyzed at a point in conduit 22 just downstream of the air preheater as shown in FIG. 1. The flue gas analysis is as follows: temperature 150° C., water content 5 volume percent, sulfur dioxide 1750 ppm (by volume, dry basis), oxygen 4.5 percent and solids content 2.5 grains/standard cubic foot (scf) (dry). Into this flue gas is injected by way of conduit 28 an air suspension of finely divided hydrated lime in amount sufficient to provide a resultant Ca:S molar ratio of about 2:1. Next, a solution of sodium hydroxide in water is sprayed into the gas stream by way of conduit 34 in an amount sufficient to result in a gas temperature about 10° C. above the adiabatic saturation point at the electrostatic precipitator (ESP) inlet and a weight ratio of NaOH to hydrated lime of about 0.1 to 1.0. The flue gas velocity in the existing duct is such that the sorbent particles have a residence time of about 2 seconds prior to passage into the ESP. The ESP has four hoppers in series and provides about 22 minutes average solids residence time on the ESP plates. The $SO_2$ content of the gas exiting the ESP is reduced to 440 parts per million volume (ppmv), dry basis. The unreacted $Ca(OH)_2$ content of the solids removed from the hopper number 1 is higher by 15, 25 and 30 percent (relative) than those from hoppers numbers 2, 3 and 4, respectively.

EXAMPLE 2

Example 1 is repeated, except that hydrated lime and recycle solids from hopper number 1 are injected into the flue gas through conduits 28 and 48, respectively, to provide a combined $Ca(OH)_2$:S molar ratio of about 2:1. The recycle solids are ground to 90 percent −25 microns by the grinder 46 before the injection. The $SO_2$ content of the gas exiting the ESP is reduced to 440 ppmv, dry basis. Because of the $Ca(OH)_2$ contribution from the recycle solids, the required fresh hydrated lime injection rate is reduced by 50 percent to a Ca:S molar ratio of about 1 to 1. This reduction in the hydrated lime requirement results in a significant saving in the overall $SO_2$ control cost.

EXAMPLE 3

As a basis for comparison, Example 2 is repeated, except that the recycle solids, the same amount as those in Example 2, are taken from the total composit solids removed from all the ESP hoppers and are injected into the flue gas without grinding. The hydrated lime injection rate required is about 20 percent higher than that in Example 2 because the $Ca(OH)_2$ contribution from the recycle solids is lower for the combined $Ca(OH)_2$:S ratio of 2 to 1.

While certain embodiments and details have been shown for the purpose of illustrating this invention, it will be apparent to those skilled in this art that various changes and modifications may be made herein without departing from the spirit or scope of the invention.

I claim:

1. A method for removing sulfur oxides from combustion gases produced during the combustion of sulfur-containing fuels comprising
   (1) placing hydrated lime and recycle sorbent into contact with said combustion gases containing sulfur oxides,
   (2) placing water into contact with the gas stream of (1) to humidify said gas to within a range of 10° C. to 35° C. of dew point and
   (3) passing the product stream of (2) through a classifying electrostatic precipitator (ESP) having at least a first upstream collection portion and a second downstream collection portion wherein (1) lime and sulfur oxides begin to react in (1) to produce calcium sulfite and calcium magnesium sulfite and (2) enhances said reaction while (3) collects unreacted lime as $Ca(OH)_2$ in the first portion of the ESP wherein said first portion is ground to a size of at least 90 percent by weight −25 microns prior to recycle to (1) to enhance sulfur oxide removal.

2. A method as described in claim 1 wherein the humidification water contains at least one water soluble additive selected from the group consisting of $Na_2O$, NaOH, and $FeCl_3$, adipic acid, dibasic organic acids and $CaCl_2$, wherein the additive is present at a level up to about 20 percent by weight based upon the hydrated lime weight.

* * * * *